Sept. 8, 1959 J. H. DYER 2,903,079
AGRICULTURAL HOE AND CULTIVATOR IMPLEMENT
Filed July 19, 1954
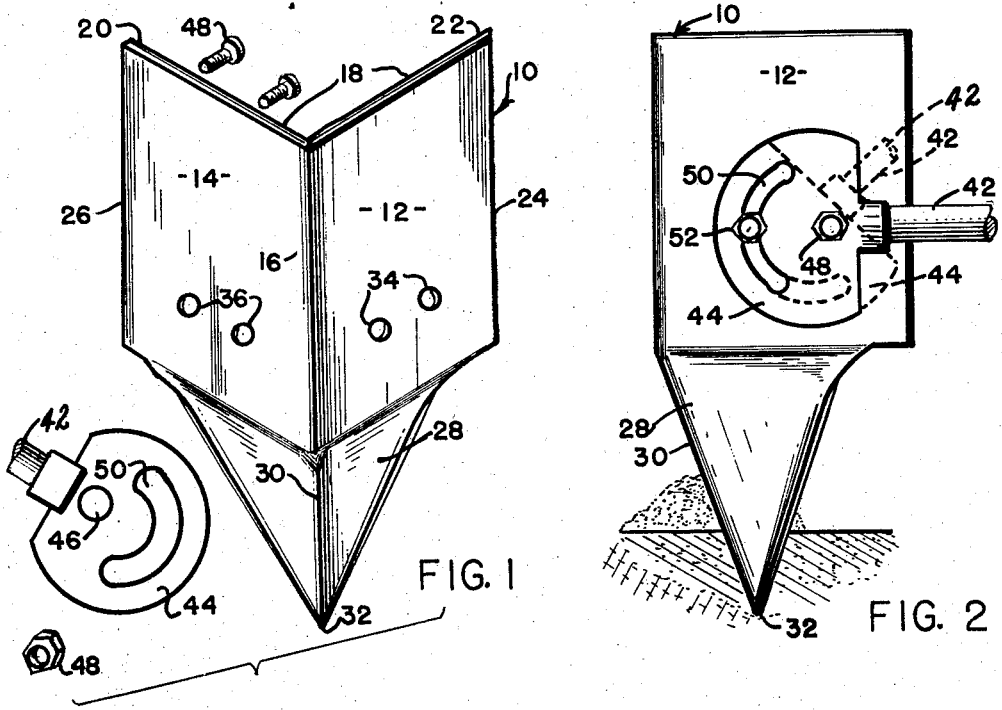
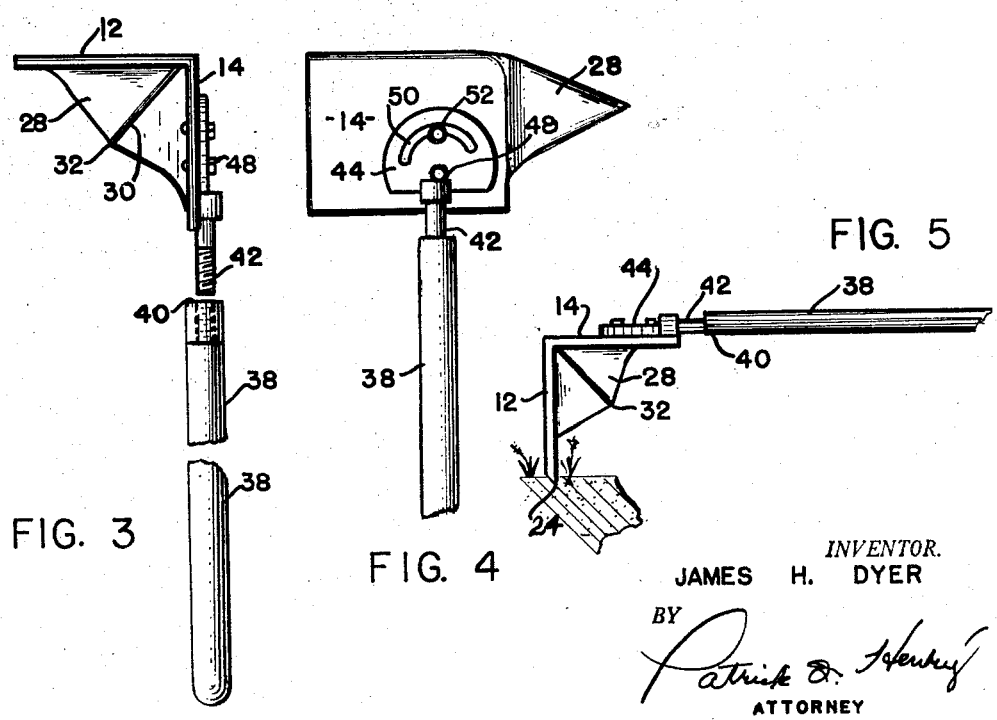
FIG. 1
FIG. 2
FIG. 3
FIG. 4
FIG. 5
INVENTOR.
JAMES H. DYER
BY
*Patrick O. Henry*
ATTORNEY > United States Patent Office 2,903,079
Patented Sept. 8, 1959

2,903,079

AGRICULTURAL HOE AND CULTIVATOR IMPLEMENT

James H. Dyer, Hapeville, Ga.

Application July 19, 1954, Serial No. 444,174

5 Claims. (Cl. 172—372)

This invention relates to an agricultural hoe and cultivator implement and particularly to a hand operated implement having combined digging, cultivating, and cutting elements.

Since various operations must be performed on the soil during the cultivation of plants and flowers it is desirable to have a tool constructed to effect a certain characteristic, as for example a tapered blade to dig a trench or a flat, sharp blade to cut straight down or an angular blade to chop at a confined point. Having several tools is expensive and cumbersome while heretofore disclosed combined tools, such as the single bladed implement with hoe blade on one end and tapered cultivator blade on the opposite end, are awkwardly arranged in view of the fact that both right-handed and left-handed as well as short, medium, and tall people must use them. There is a great need for a single tool which may be used for many different soil cultivating operations and by different types of people.

One object of this invention is to disclose a single tool which will hoe, cut, and cultivate.

A further object of this invention is to provide a combined hoe, cutter, and cultivator implement which is conveniently adjustable for either right-handed or left-handed people.

Another object resides in an adjustable arrangement of the handle for height as well as for right- and left-handed people.

In arriving at the principal objects of my invention I provide additional features in the effective and inexpensive manner of constructions and arrangements of my implement.

Other and further objects and advantages will be apparent from the following description of a preferred embodiment of the invention taken in conjunction with the accompanying drawings, in which:

Fig. 1 is a pictorial view of the head of my implement with associated parts in dis-assembled position.

Fig. 2 is a side elevation view of the device of Fig. 1 with the cultivator blade in left-handed ground engaging position and with dotted lines showing an adjustment.

Fig. 3 is a top plan view of the implement of Fig. 1 with the handle dis-assembled.

Fig. 4 is a top plan view of the device of Fig. 1 but with the head revolved from Fig. 2 position to place one of the hoe edges in engagement with the ground.

Fig. 5 is a left side elevation view of the implement as it engages the ground in the position of Fig. 4.

Beginning initially with Fig. 1 in the drawings and then proceeding to the other views, the implement has as its principal tool a head 10 comprising a pair of flat blade members 12, 14 integrally joined about a line 16 and angularly related to each other thereby forming a "V-shaped" top edge 18 which is beveled and sharpened into cutting edges 20, 22. The exposed respective side edges 24, 26 of blades 12, 14 are also sharpened and beveled into cutting hoe edges. The bottom portion of blades 12, 14 each extends into an integral, tapered and curved bottom "scoop-like" cultivator member 28 which is formed about a center line 30 converging at an apex or point 32 beneath and behind the bottom edges of blades 12, 14.

The flat front of each blade member 12, 14 has respective bolt holes 34, 36 thereon spaced to align with a particular form of handle attachment. The handle shaft 38 may be of the conventional hard wood or like material in cylindrical form with an internally threaded socket 40 at the attaching end thereof. The socket detachably receives a threaded shaft member 42 which is integrally formed with or welded or otherwise secured to an attaching plate 44 having a pivot and bolt hole 46 for alignment with one of the outside bolt holes 34, 36 on either of the blades 12, 14 to receive a bolt and nut assembly 48. Spaced from the bolt hole 46 a distance equal to the space between the holes 34 is an arcuate adjusting slot 50 just large enough to receive the bolt shaft of another bolt assembly 52 with the nut thereof bearing on plate 44. If it is desired, other implements, such as a shovel or fork, may be attached on the socket end 40.

As is readily seen in the drawings, and particularly Fig. 2, when the handle socket 40 is firmly engaged with threaded shaft 42 and attaching plate 44 bolted by 48, 52 to either one of the plates 12, 14, a rigid implement is presented having a "scoop-like" blade at one end thereof, two hoe blades 24, 26 and an angular chopping blade 18—all placed into use simply by rotating the handle to select the particular one to be used on the ground. By loosening nut assembly 52, the handle 38 and plate 44 may be rotated about bolt assembly 48, acting as a pivot, and secured in any desired new position (such as indicated by the dotted lines in Fig. 2). During certain instances of use this provides an adjustment in height and inclination of the handle to the ground so that short or tall people alike may achieve their comfortable position. This also makes it possible to adjust the position of the handle horizontally when the device is being used in the position in Fig. 5.

The head 10 may be made from several parts welded or otherwise secured together. Blades 12, 14 can be fabricated from small rectangular plates and then joined together along line 16. Likewise, the "scoop-like" member 28 can be formed from two triangular plates bent and joined together about line 30 and fixed onto the bottom of a respective plate 12, 14. However, it is much simpler to bend the entire head from one flat plate cut triangular at the bottom and rectangular at the top. A bend along line 16, along the bottom of 12 and 14, and along line 30 provides the necessary shape.

In using the tool, the edges 20, 22 forming the angular blade 18 provide an extremely effective chopping device for cutting away undesirable material. Rotating the implement 180 degrees as a unit from chopping position places the "scoop-like" member 28 against the ground so that digging, loosening, and cultivating may be performed while intermittently, as needed, the implement can be rotated 90 degrees to provide a hoe, as in the manner of Fig. 5. When in the position of Fig. 5 the handle may be adjusted horizontally about pivot 48 for convenient location. When using either the hoe blades 24, 26 or the "scoop-like" member 28, the handle may be adjusted vertically for inclination.

The fact that attaching means is provided on each blade at 34, 36 makes it possible to attach handle 38 to either of the blades 12, 14. This provides a selective right-handed or left-handed use of the "scoop-like" member 28 since the head lies completely to one side of the handle 38 and a left-handed person finds it more natural to work with the head disposed on the right side while a right-handed person prefers it on the left hand side in the manner shown in Fig. 3. Since there are two hoe edges 24, 26 there will be a hoe available in either right or left hand position of the head 10.

Although I have described in detail a preferred form of my combined implement and illustrated this with specific elements, that is not to be construed as a limitation on the latitude of my invention since various modifications, eliminations, substitutions, and variations may be made in the disclosed embodiment without departing from the invention, reference being had to the following claims for constructions as to the scope of invention.

I claim:

1. In an agricultural implement of the character described, a head portion consisting of a pair of substantially planar and identical blade members connected with each other about a common straight line on said head, said blades thereby presenting two blades intersecting at an angle with each other, independent connecting means on each of said blade members, a scoop-like blade member attached to each of said pair of blade members at a portion of the edges thereof and extending outwardly therefrom substantially symmetrical about said common line, a handle member, and attaching means on said handle member selectively attachable to either of said pair of blades rearward of said blade intersection so as to provide a hoe with a selective right or left hand cultivator.

2. An agricultural implement of the character described, a head portion consisting of a pair of substantially planar identical blade members connected with each other about a common line and having blade edges disposed about said line thereby presenting two blade edges intersecting with each other at an angle, each of said blade members having an outside straight cutting edge disposed substantially parallel to the line of intersection with the intersecting edges on one side of the pair of blades being cutting blades together forming a substantially "V-shaped" cutting surface, the other intersecting edges of said pair of blades disposed about said line of intersection each having a depending portion converging and joining in tapering relationship to form a scoop-like blade member lying in opposition to said "V-shaped" cutting surface, and handle means adjustably attached to said head portion.

3. In an agricultural implement of the character described, a head portion consisting of a pair of flat, substantially identical blade members each having a substantially straight blade edge portion, means joining said blade members at an angle with each other about a line formed by abutting an edge of one of said members with a corresponding edge on the other, a pair of spaced connecting holes on the flat portion of each of said blade members, a handle member having an attaching plate formed on the end thereof, said attaching plate having an attaching hole and an attaching slot, bolt means for fastening said plate to a selected one of said blade members with a fixed pivot at one of said holes and a selective sliding connection about said slot whereby said handle may be selectively fixed in any one of a number of positions, and a tapered cultivator blade member fixed on said head in depending relation about the line joining said blade members, by virtue of which said implement may be set for right or left hand operation as well as for angle of inclination with respect to the ground.

4. In an implement of the character described, an implement head consisting of a pair of substantially planar identical blade members with one of the edges of each thereof angularly spaced apart, said edges being sharpened for cutting, a cultivator blade mounted on and protruding from said head below said blade members, connecting means on each of said blade members through which said head may be supported, a handle, attaching means on said handle for connection to either one of said connecting means on a respective blade thereby placing one blade on and against said handle and the other blade spaced substantially the amount of the angle between said blade members from said handle, adjustment means associated with said attaching and connecting means, and lock means for locking said adjustment means.

5. In an agricultural implement of the character described, a head portion consisting of a pair of flat blade members, said blade members being integrally joined at an angle with each other about a substantially straight line forming the junction therebetween as the apex of a "V-shape," each of the exposed side and top edges of said blade members being beveled to form cutting edges, a connecting portion on the flat surface of each of said blade members, the bottom edges of said blade members extending in tapered relationship to form a depending "scoop-like" blade member converging at a point below and rearwardly of the apex of said "V-shape," a handle member, an attaching plate on said handle having pivot means for attachment to either one of the connecting portions on one of said blade members with said handle extending rearwardly from said "V-apex", and lock means for locking said head portion in a selected position, by virtue of which said handle may be adjusted and locked on either one of said blade members.

References Cited in the file of this patent

UNITED STATES PATENTS

| 492,364 | Powers | Feb. 21, 1893 |
| 1,610,874 | Marthen | Dec. 14, 1926 |
| 1,711,847 | Hermanson | May 7, 1929 |
| 1,940,169 | Hinton | Dec. 19, 1933 |
| 2,536,180 | Hines | Jan. 2, 1951 |
| 2,625,871 | Miller | Jan. 20, 1953 |

FOREIGN PATENTS

| 794,075 | France | Dec. 2, 1935 |